US008056218B2

(12) United States Patent
Nickol et al.

(10) Patent No.: US 8,056,218 B2
(45) Date of Patent: Nov. 15, 2011

(54) CRIMPING APPARATUS FOR CABLES, PARTICULARLY SHIELDED CABLES

(75) Inventors: Marcell Nickol, Creuzburg/Scherbda (DE); Andreas Amstein, Eisenach (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 591 days.

(21) Appl. No.: 12/284,417

(22) Filed: Sep. 22, 2008

(65) Prior Publication Data

US 2009/0083974 A1 Apr. 2, 2009

(30) Foreign Application Priority Data

Sep. 28, 2007 (DE) .................... 20 2007 013 638 U

(51) Int. Cl.
*B23P 19/00* (2006.01)
*H01R 43/042* (2006.01)

(52) U.S. Cl. ................ 29/753; 29/237; 29/751; 72/402; 72/404; 72/409.06; 72/409.14

(58) Field of Classification Search .................... 29/753, 29/237, 282, 517, 751; 72/76, 402, 404, 72/409.06, 409.14, 409.16, 416, 473
See application file for complete search history.

(56) References Cited

U.S. PATENT DOCUMENTS

| | | | | |
|---|---|---|---|---|
| 4,041,766 | A * | 8/1977 | Johnson et al. | 72/402 |
| 5,038,461 | A * | 8/1991 | Cerda | 29/753 |
| 6,997,028 | B2 | 2/2006 | Schmode | |
| 7,055,361 | B2 | 6/2006 | Hetlund | |
| 7,325,438 | B2 | 2/2008 | Heggemann | |

* cited by examiner

*Primary Examiner* — Thiem Phan

(74) *Attorney, Agent, or Firm* — Lawrence E. Laubscher, Sr.; Lawrence E. Laubscher, Jr.

(57) ABSTRACT

Crimping apparatus for crimping separate parts of a metal sleeve arranged concentrically about the junction between a shielded cable and a plug connector, including a pair of colinearly arranged annular crimping dies that are operable by an annular operating member arranged concentrically about the crimping dies, such that upon a single angular movement of the operating member in a given direction from a retracted position to a crimping position, one end of the sleeve is crimped to the plug in one desired manner, and the other end of the sleeve is crimped to the shielded cable in another desired manner.

9 Claims, 12 Drawing Sheets

CRIMPING APPARATUS FOR CABLES, PARTICULARLY SHIELDED CABLES

BACKGROUND OF THE INVENTION

1. Field of the Invention

Crimping apparatus for crimping separate parts of a metal sleeve arranged concentrically about the junction between a shielded cable and a plug connector, such that upon a single angular movement of an annular operating member in a given direction about its longitudinal axis, one end of the sleeve is crimped to the plug in one manner, and the other end of the sleeve is crimped to the shielded cable in another manner.

2. Description of Related Art

Various models of crimping devices are well known in the electrical connector art, as shown, for example, by the prior U.S. patents to Schmode No. 6,997,028, Hetland et al No. 7,055,361, Heggemann et al No. 7,325,438, each assigned to the same assignee as the present invention.

The present invention was developed to provide a crimping device that can be used especially for the crimping of cables, where the terminal segment of a shielded cable (or conductor) is to be crimped several times with at least one metal sleeve in the exposed area. The invention-based crimping device is designed to create at least two or more axially mutually offset crimping areas in only one work step. In this way, the time needed for crimping is kept at a minimum, and one can also make sure that the two crimping areas always have a constant interval from each other.

Preferably, two or more axially mutually offset crimping dies are provided, which again, in a particularly preferred manner, are coupled together in a non-rotatable fashion. These crimping dies are of simple structure and preferably include crimping dies that are coupled together in a non-rotatable fashion and that in each case act upon radially displaceable crimping bars.

Preferably, the crimping depth of at least one crimping die is made adjustable, and the crimping depth of the other crimping die is firmly preset in order to be able to make or process the various crimping depths and cable diameters.

SUMMARY OF THE INVENTION

Accordingly, a primary object of the present invention is to provide apparatus for crimping separate parts of a protective metal sleeve arranged concentrically about the junction between a shielded cable and a plug connector, including a pair of colinearly arranged annular crimping dies that are operable by an annular operating member arranged concentrically about the crimping dies, such that upon a single movement of the operating member in a given direction, one end of the sleeve is crimped to the plug in one manner, and the other end of the sleeve is crimped to the shielded cable in another manner.

According to another object of the invention, an annular operating member is journaled for angular displacement about a fixed support shaft such that upon a single angular displacement of the operating member from a retracted position to a crimping position, two annular cam members connected with the operating member displace two sets of radially arranged crimping rods axially inwardly to crimp separate parts of the metal sleeve in a desired distinctive manner to a plug and to a shielded cable connected with the plug, respectively.

According to a more specific object of the invention, adjustable stop means limit the extent of angular displacement of the operating member, thereby to control the depth of crimp produced by at least on of the sets of crimping rods.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 2:
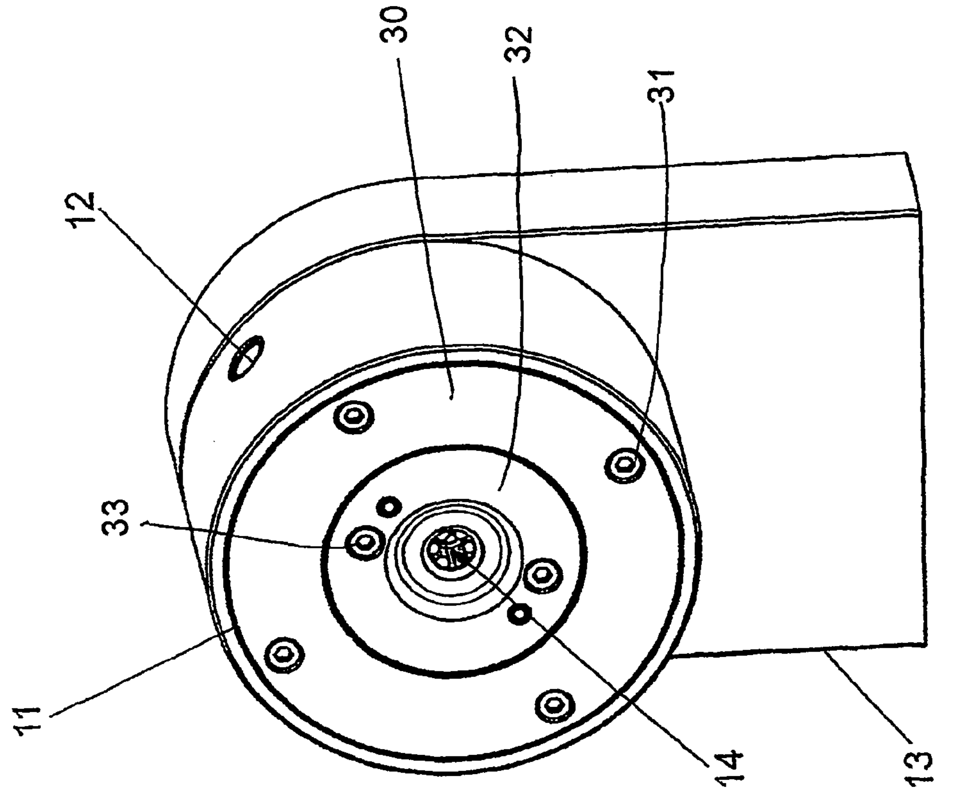
FIGS. 1 and 2 are left and right front perspective views, respectively, of the crimping apparatus of the present invention with the operating lever removed.
Figure 1:
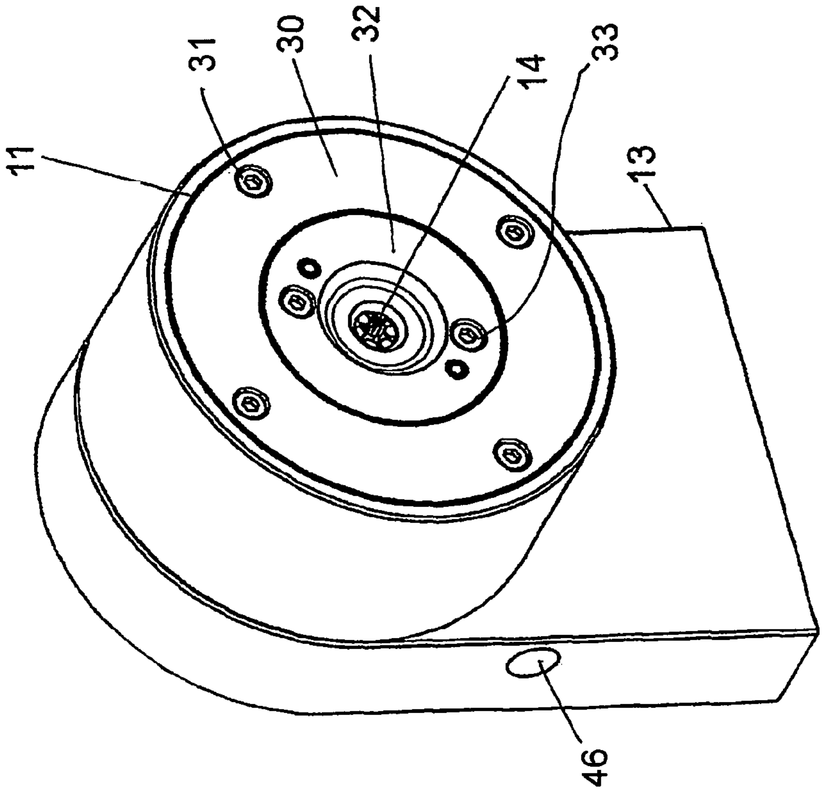

Referring first more particularly to FIGS. 1-3, the crimping apparatus 2 of the present invention includes a vertical fixed pedestal 13 that extends upwardly from the fixed base 1 and which supports an annular operating member 11 for angular displacement about a fixed horizontal longitudinal axis. The operating member contain a first threaded opening 12 for receiving a radially outwardly extending manually-operable operating lever 3, as shown in FIGS. 3*a* and 3*b*. An annular outer face plate 30 is fastened to the operating member 11 by screws or bolts 31, and an inner circular face plate 32 fastened to the operating member by screws or bolts 33. An insertion opening 14 is provided along the longitudinal axis of the operating member for receiving the partially assembled arrangement of connector parts (FIGS. 4*a*-4*c*) that are to be crimped together. The pedestal 13 contains a second threaded opening 46 for receiving crimping depth control means 47, as will be described in greater detail below.

Figure 3A:
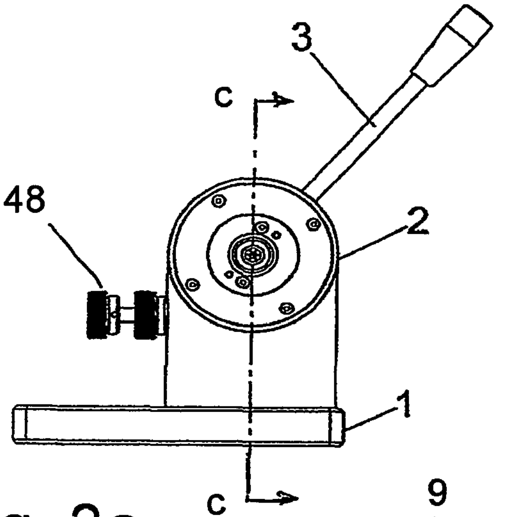
FIGS. 3*a* and 3*b* are front and side elevation views, respectively, of the apparatus of FIGS. 1 and 2 with the operating lever attached.
Figure 3B:
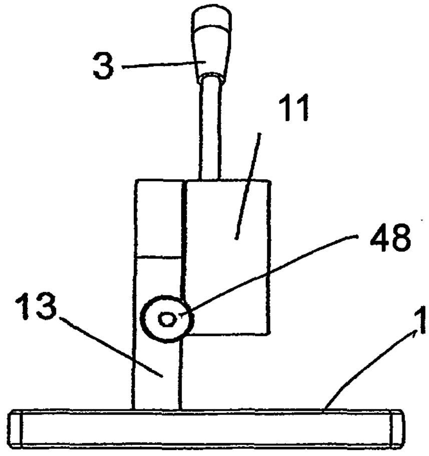
Figure 3D:
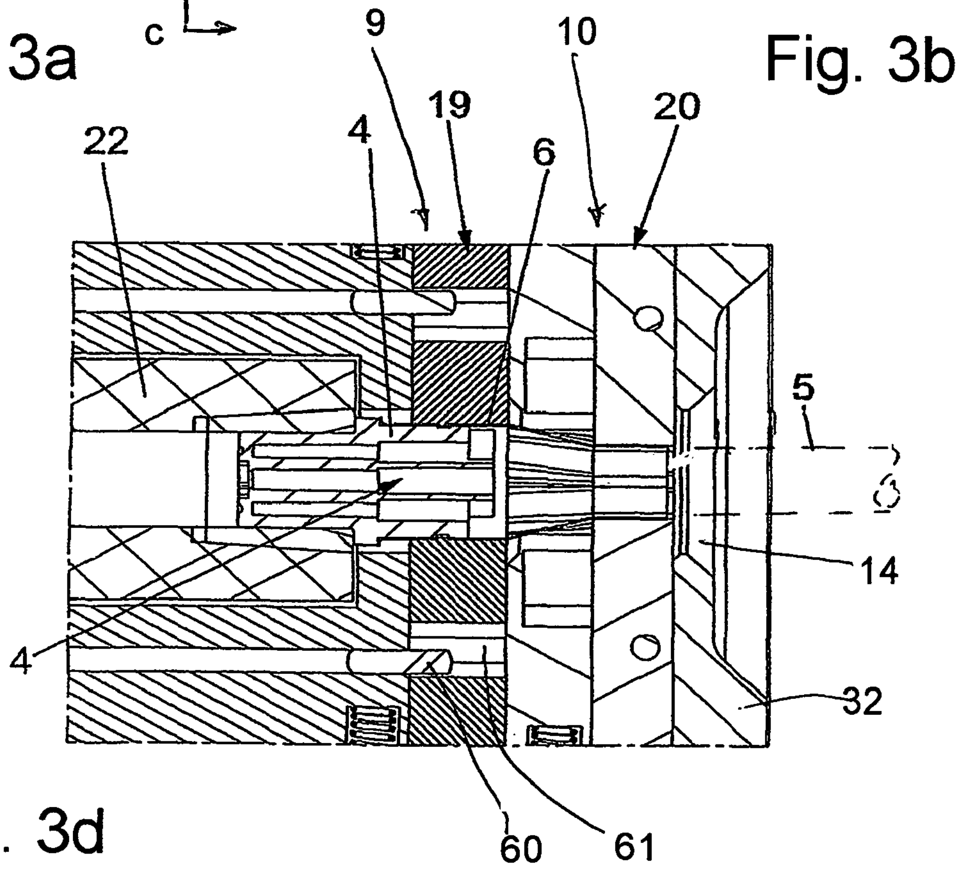
FIG. 3*d* is an enlarged detailed view of the section indicated by the box outline in FIG. 2*c;*
Figure 5A:
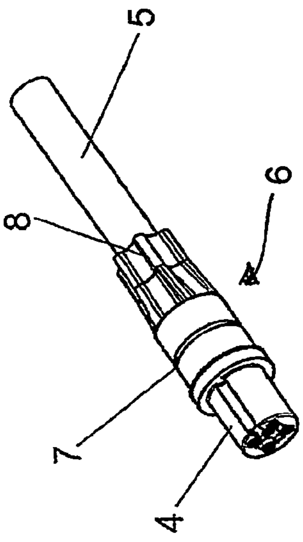
FIGS. 5*a* and 5*b* are front and rear perspective views of the sleeve when crimped at opposite ends to the junction between the plug and the shielded cable.
Figure 5B:
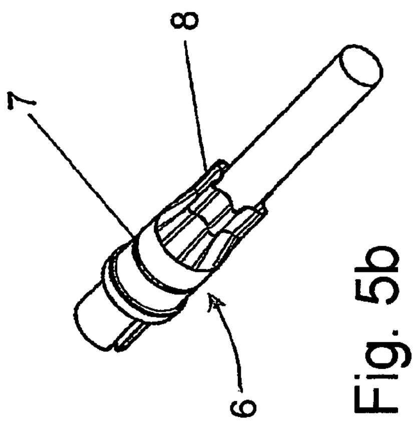
Figure 4A:
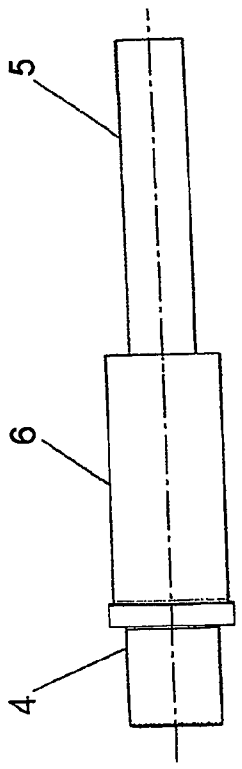
FIGS. 4*a*-4*c* are side elevation, front perspective, and rear perspective views, respectively, of a metal sleeve member arranged concentrically about the junction between a female plug and a shielded cable prior to the crimping operation.
Figure 4B:
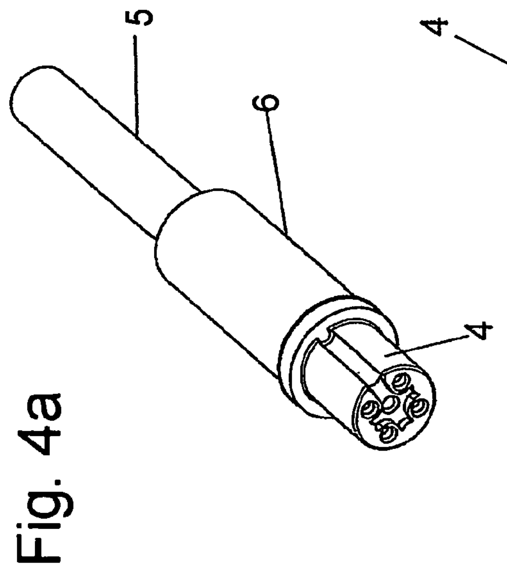
Figure 4C:
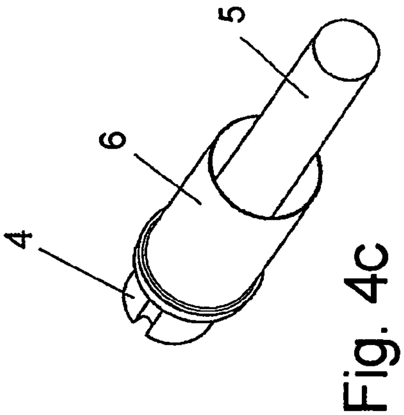
Figure 7:
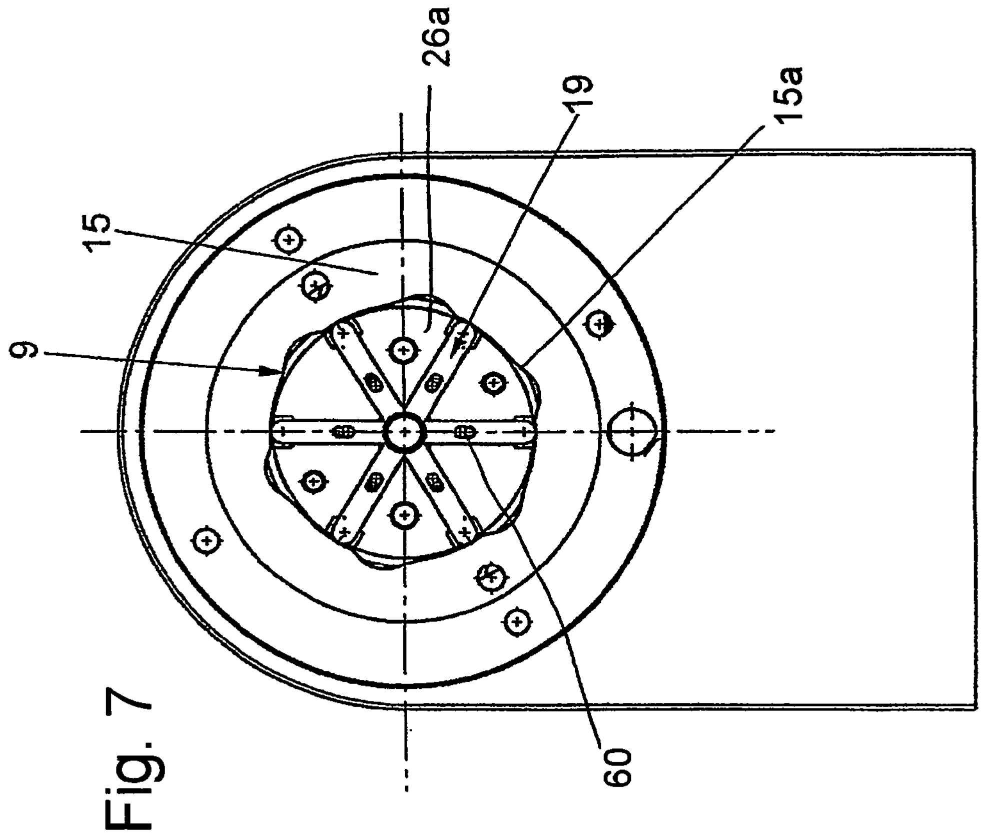
FIG. 7 is a corresponding view with one of the die members and the associated crimping rods removed.
Figure 6:
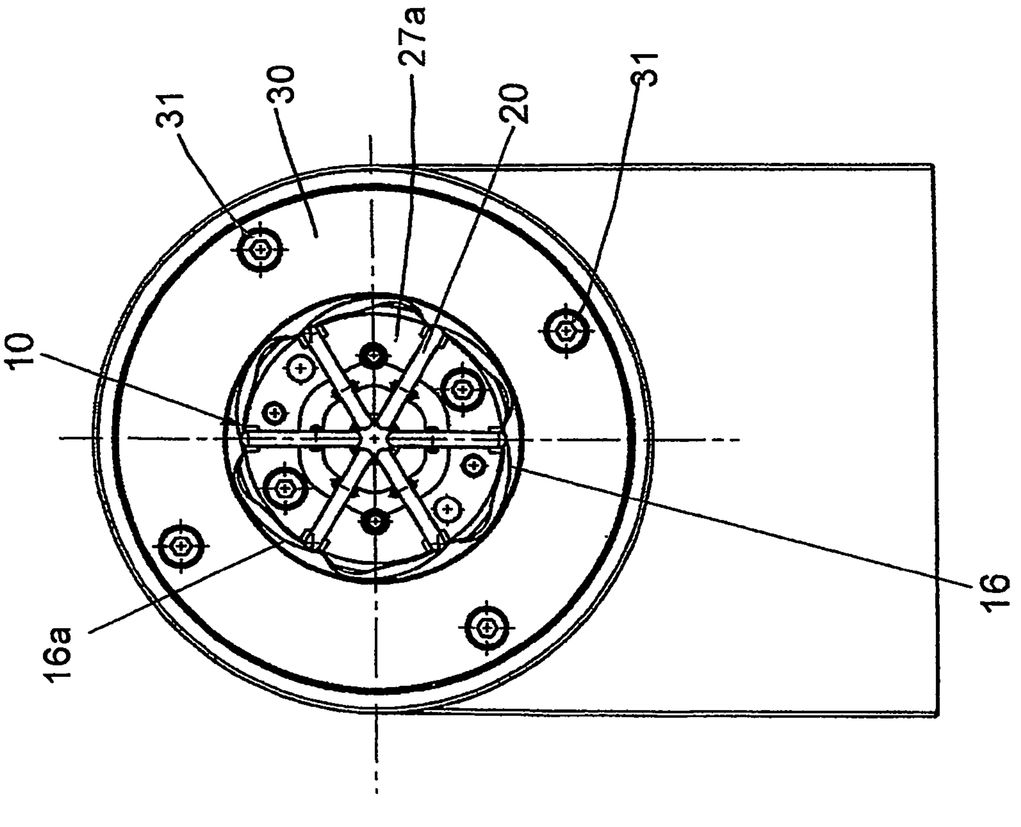
FIG. 6 is a front view of the apparatus of FIG. 1 with one face plate removed.
Figure 8:
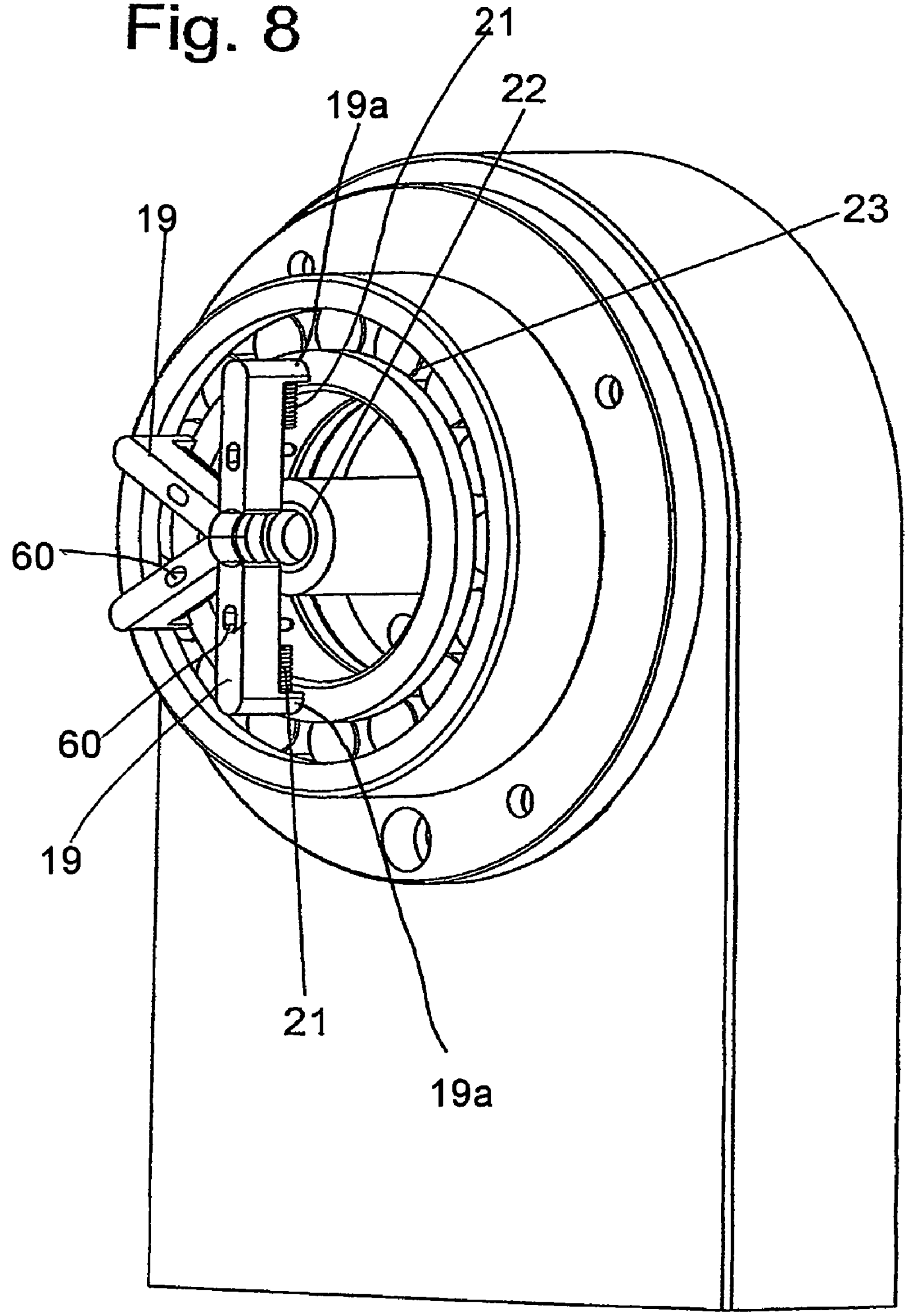
FIGS. 8 and 9 are perspective views illustrating the apparatus of FIG. 7 before and after the plug end of the cable is inserted into the insertion opening of the apparatus.
Figure 9:
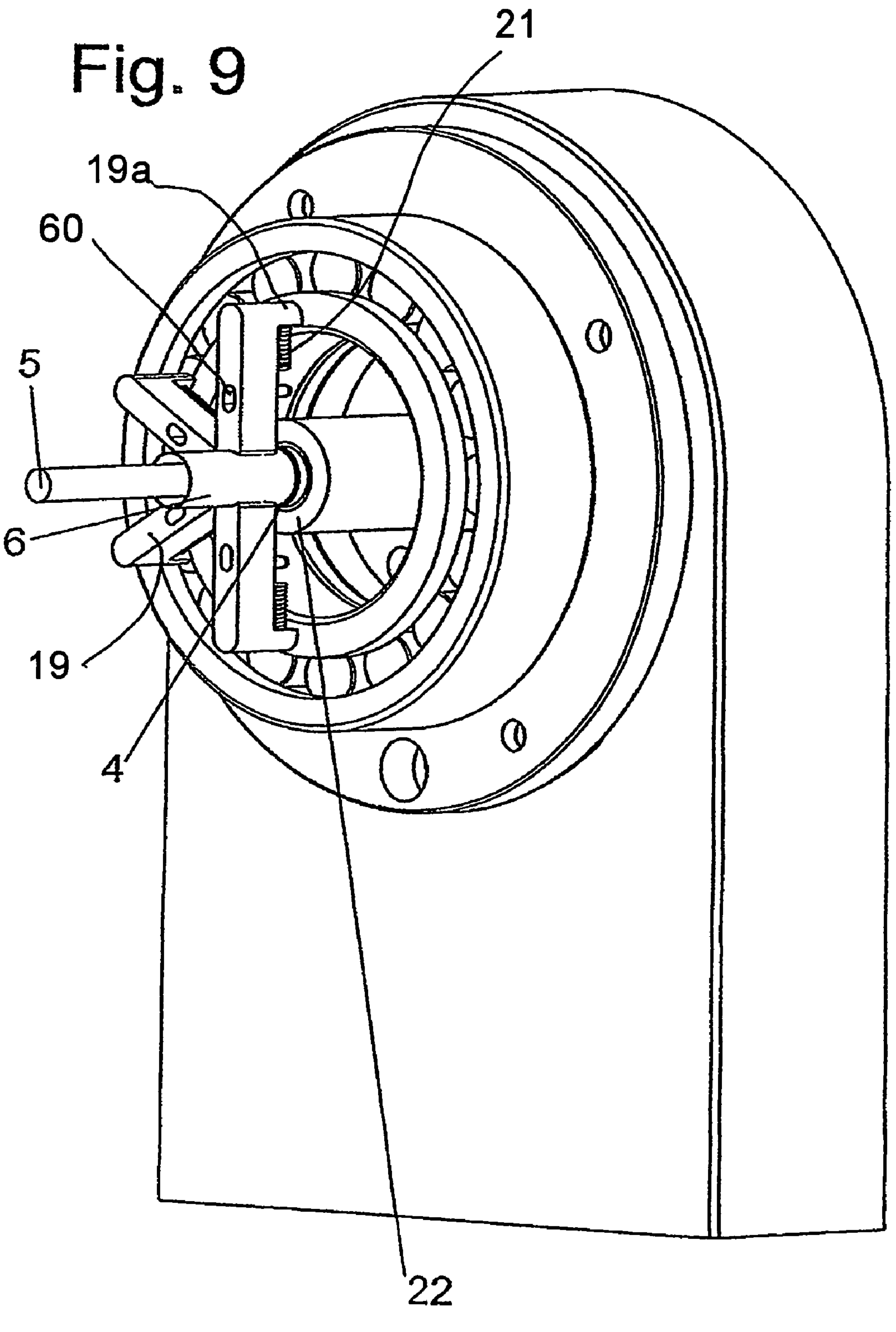
Figure 11:
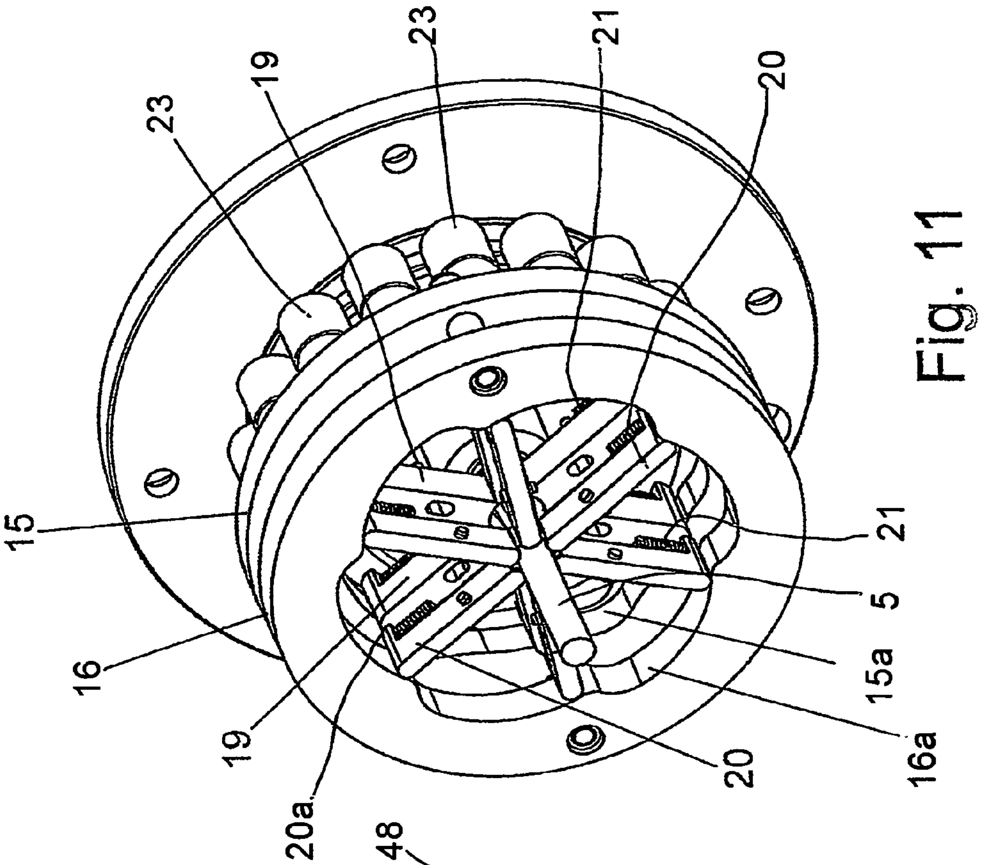
FIG. 11 is a front perspective view illustrating the operation of the two crimping die means.

Referring now to FIGS. 4*a*-4*c*, a tubular protective metal sleeve 6 is arranged concentrically about the junction between a female plug connector 4 and the associated shielded cable 5. According to a characterizing feature of the present invention, first die means 9 (FIG. 3*d*) are provided for crimping one end of the tubular sleeve to the plug connector 4, and second die means 10 are provided for crimping the other end of the sleeve to the shielded cable 5. As shown in FIGS. 5*a* and 5*b*, the end portion 7 that is crimped to the plug contains an annular bulge, and the end 8 that is crimped to the cable has a generally star-shaped cross-sectional configuration.

Figure 3C:
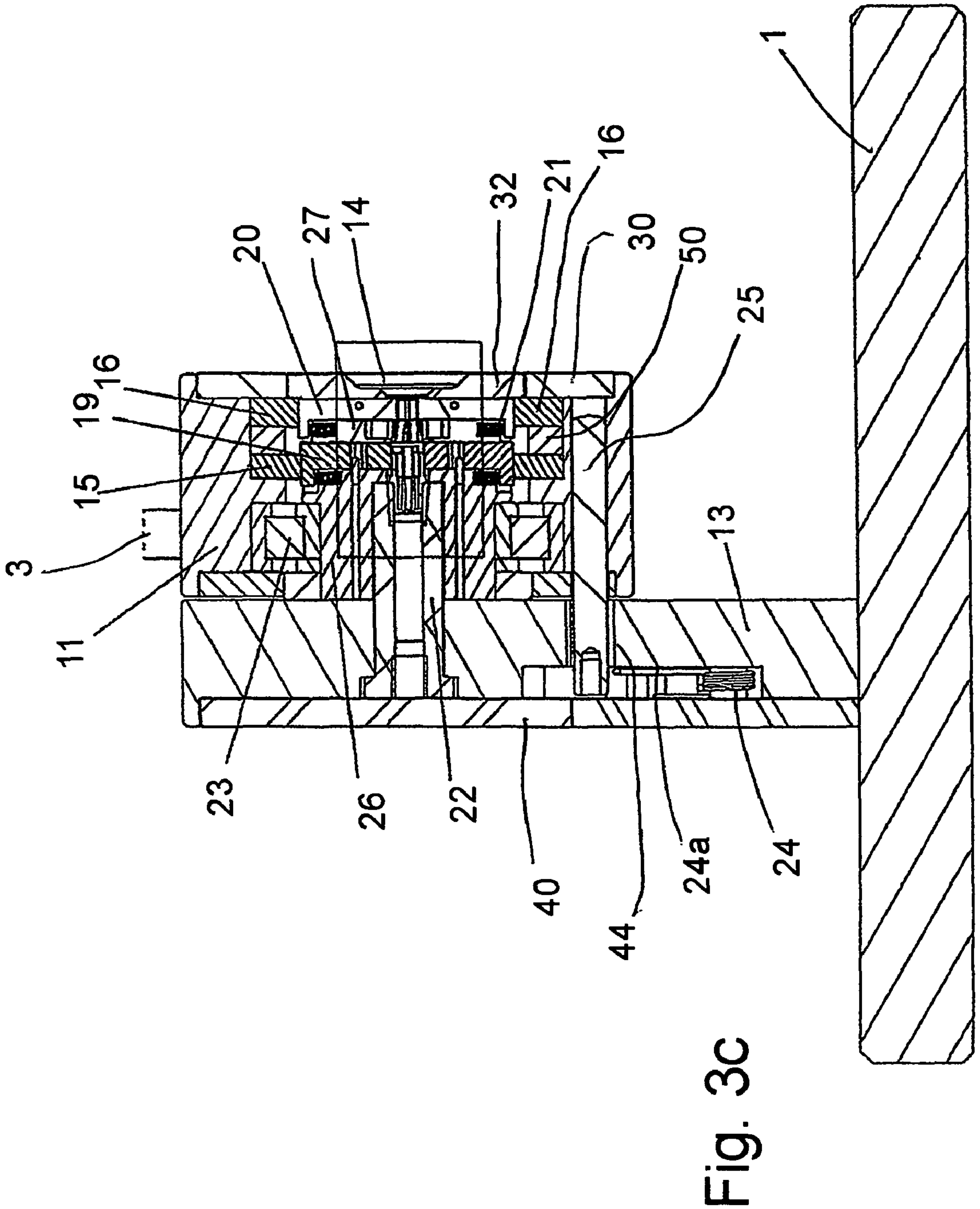
FIG. 3*c* is a sectional view taken along line c-c of FIG. 3*a*.
Figure 12A:
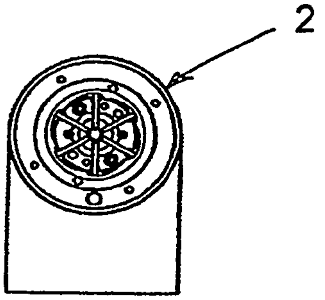
FIGS. 12*a* and 12*b* are front and detailed views, respectively, of the crimping apparatus second die means, with certain parts removed, when in the retracted loading condition.
Figure 12B:
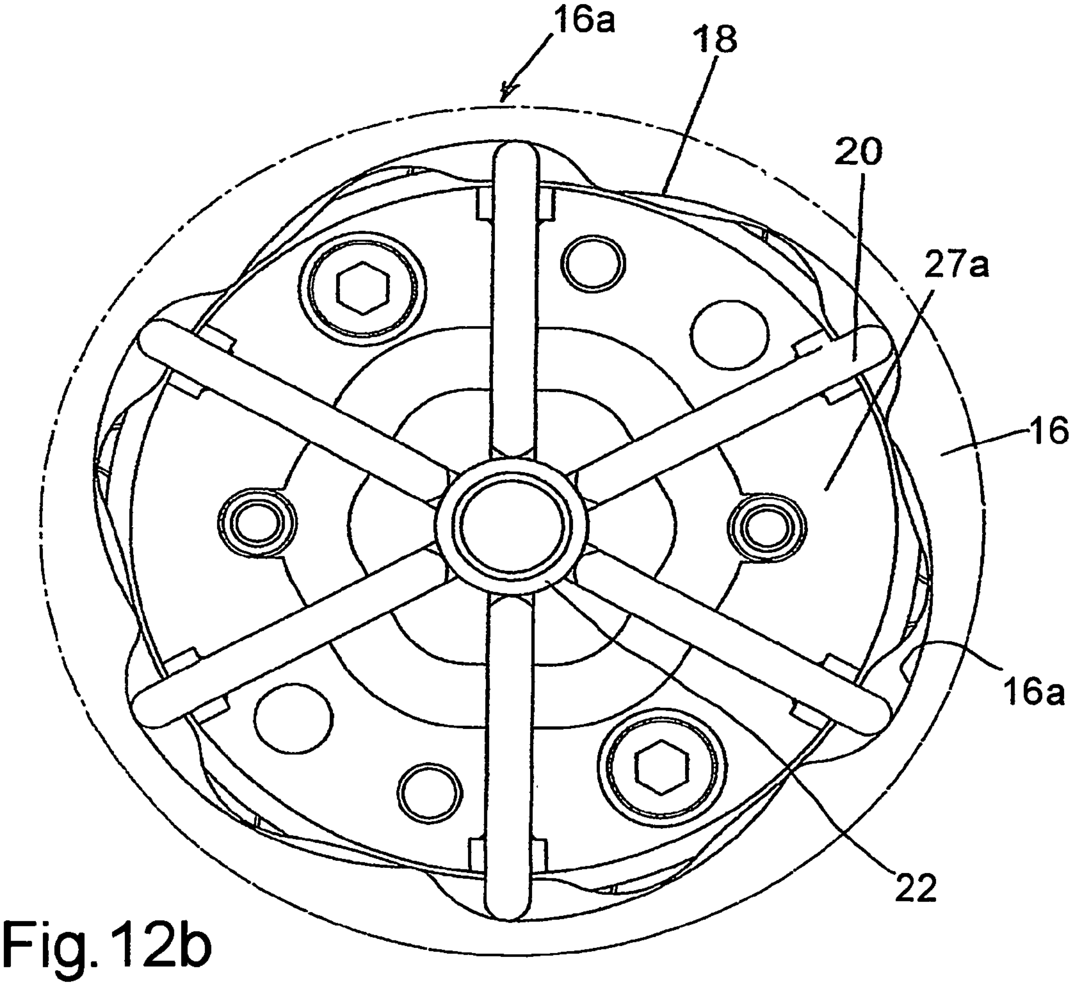
Figure 14A:
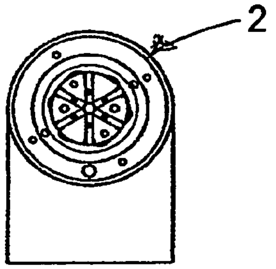
FIGS. 14*a* and 14*b* are front and detailed views, respectively, of the crimping apparatus first die means, with certain parts removed, when in the retracted loading condition.
Figure 14B:
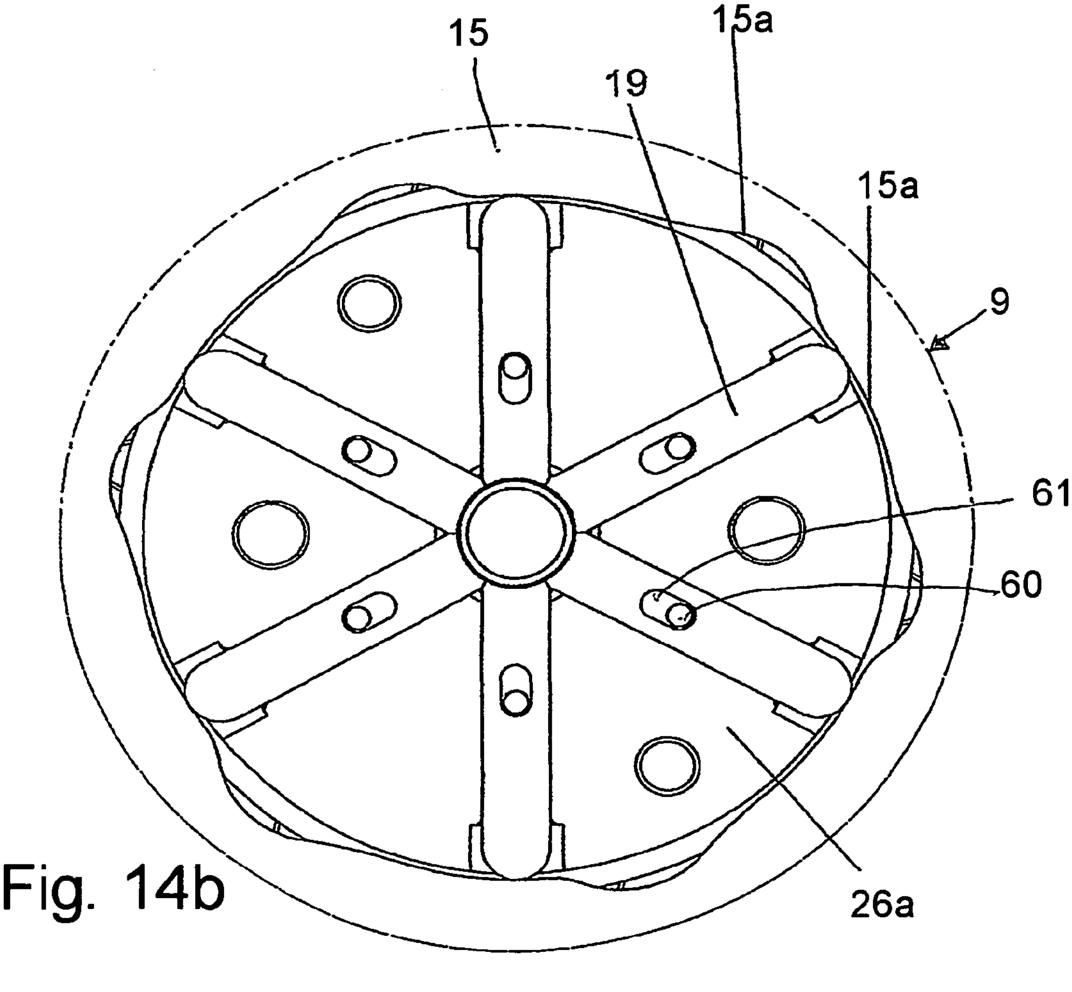

Referring now to FIGS. 3*c* and 3*d*, the pedestal 13 carries a fixed horizontal support shaft 22 which contains a through bore for receiving at one end one end of the plug 4. Mounted in fixed relation concentrically about the support shaft 22 is an annular first die member 26. Roller bearing means 23 supports the annular operating member 11 for rotational angular displacement about the first die body 26, and concentrically about the longitudinal axis of the support shaft 22. The first die body 26 has a die face 26*a* (FIG. 14*b*) which contains a plurality of radial slots in which are slidably mounted a set of first crimping rods 19. A second die body 27 is fixed to the first die body and includes a second die face 27*a* (FIG. 12*b*) containing a plurality of radial slots in which are slidably mounted a set of second crimping rods 20. As shown in FIGS. 3*d* and 14*b*, the extent of axial sliding displacement of the first crimping bars 19 relative to the first die member 26 is limited as a result of fixed stop pins 60 that extend from the die face 26*a* into corresponding axially-extending slots 61 contained in the first crimping bars 19. As best shown in FIG. 3*d*, when the plug 4 is inserted completely into the insertion opening 14, the metal sleeve 6 is partially arranged at one end within the first die means 9 concentrically about the adjacent portion of the plug 4. The other end of the sleeve 6 is arranged in the second die means 10 concentrically around the adjacent portion of the shielded cable 5.

The first and second die means include first and second annular cam members 15 and 16 arranged concentrically around the faces 26*a* and 27*a* of the first and second die members, respectively. These cam members are spaced by annular spacer ring 50 and are non-rotatably fastened to the operating member 11 for angular displacement therewith about the longitudinal axis of the support shaft 22. The cam members include on their inner circumferences cam surfaces 15*a* and 16*a* arranged for abutting engagement by the outer ends of the associated crimping rods 19 and 20, respectively. Helical compressions springs 21 (FIG. 3*c*) react between the die members and offsets 19*a* and 20*a* of the associated crimping rods to bias the crimping rods radially outwardly in to engagement with the associated cam surfaces, respectively.

Operation

Figure 10:
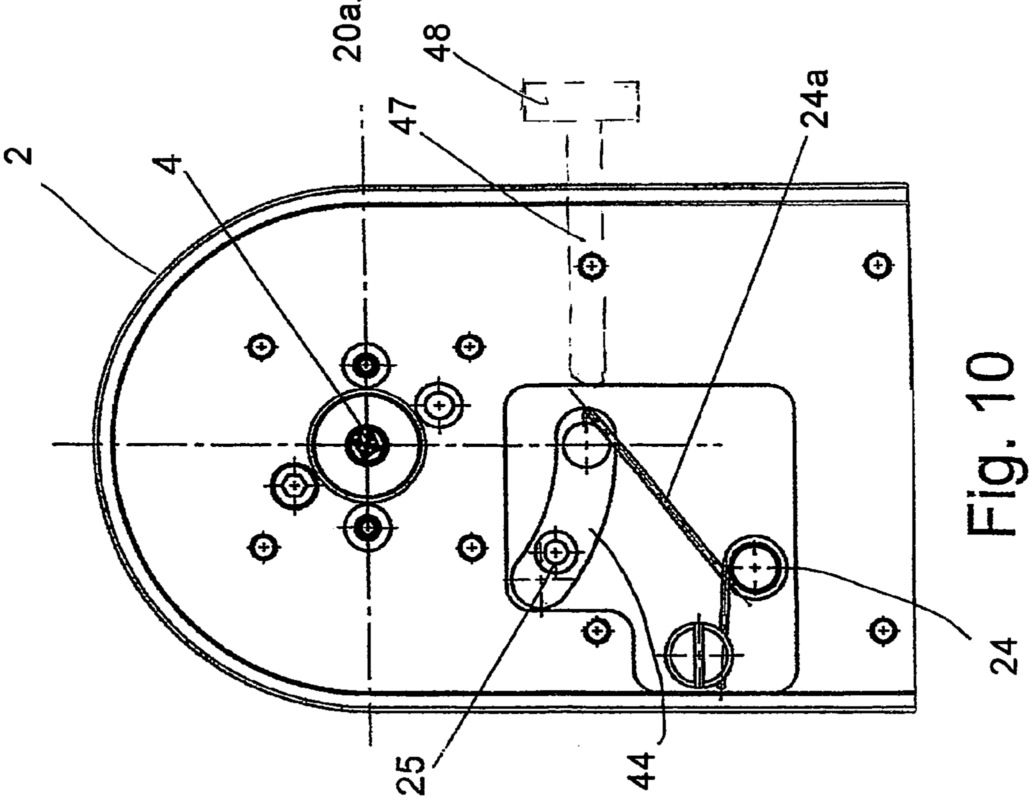
FIG. 10 is a rear view of the apparatus with certain pats broken away.
Figure 13A:
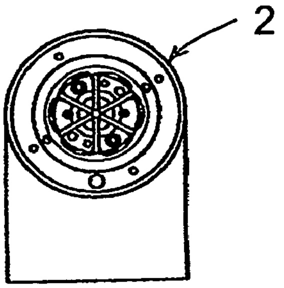
FIGS. 13*a* and 13*b* are corresponding views of the crimping apparatus when in the crimping condition.
Figure 13B:
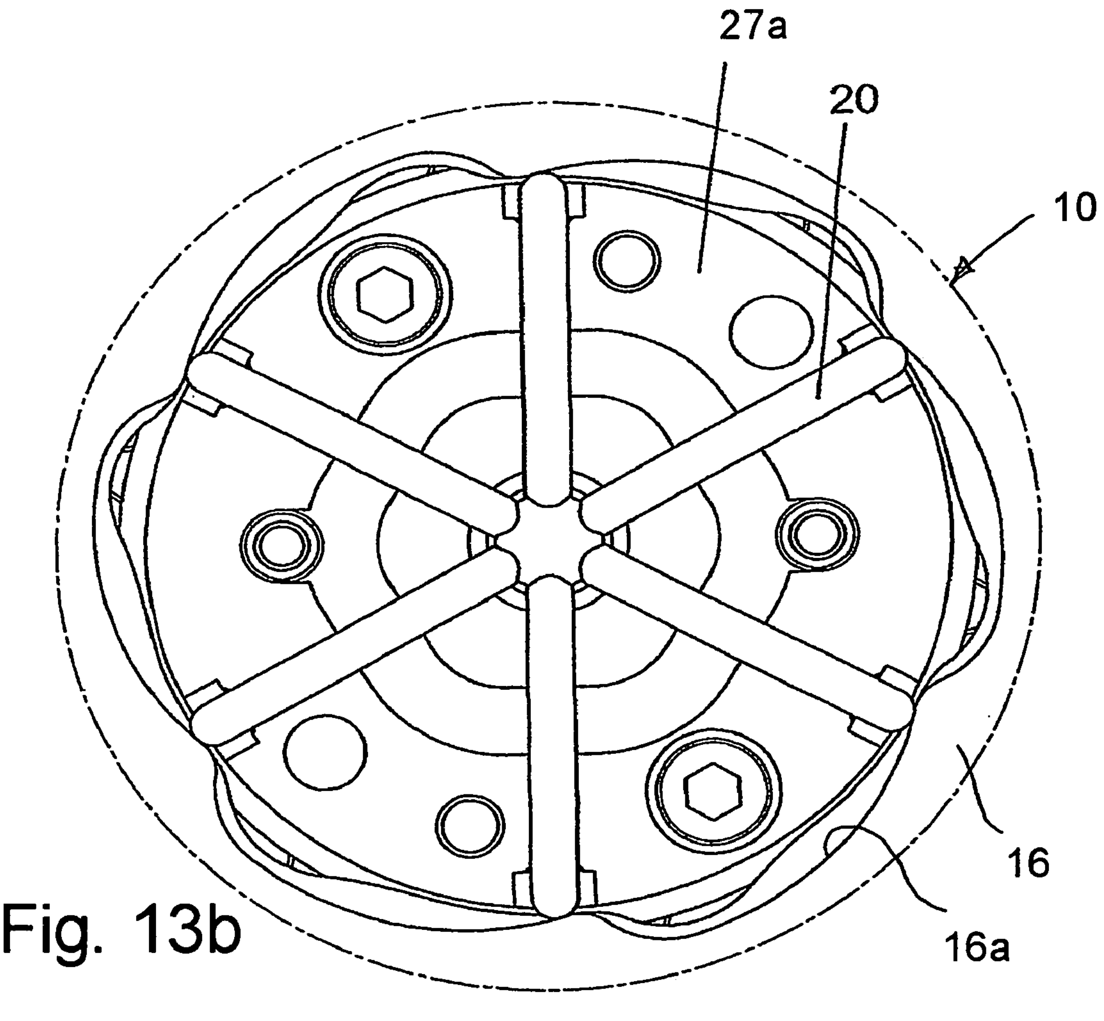
Figure 15A:
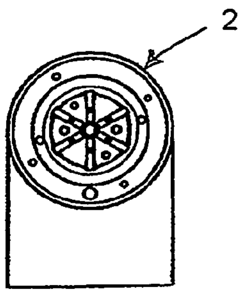
FIGS. 15*a* and 15*b* are corresponding views of the crimping apparatus when in the crimping condition.
Figure 15B:
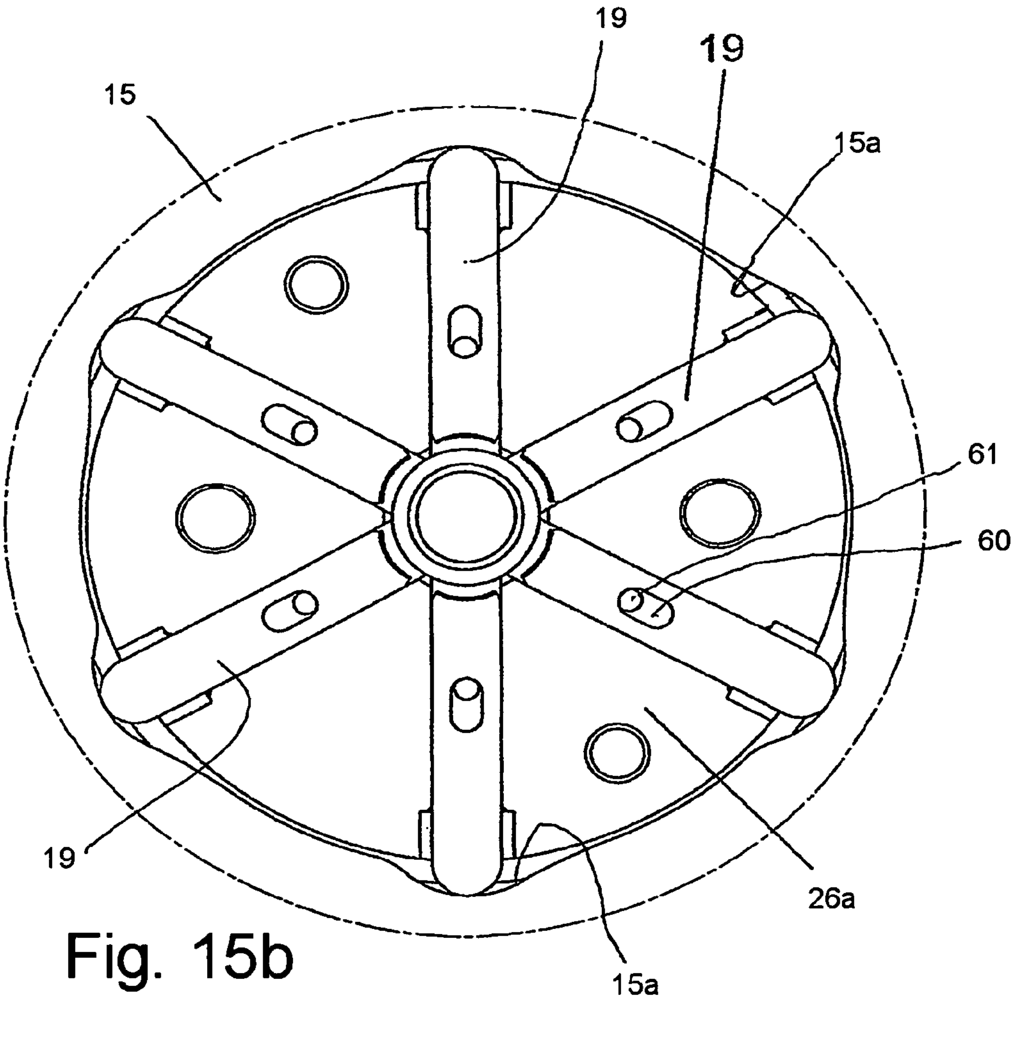

Assume that the partially assembled connector arrangement of FIGS. 4*a*-4*b* is inserted plug first into the introduction opening 14. Upon angular displacement of the operating member 11 by lever 3 from its retracted position toward the crimping position, the first crimping rods 19 are displaced radially inwardly against the biasing force of springs 21 by the cam surface 15*a* from the retracted condition of FIG. 15*b* toward the crimping condition of FIG. 14*b*, thereby forming the crimped portion 7 on the sleeve 6, as shown in FIGS. 5*a* and 5*b*. Similarly, the cam surface 16*a* of the second cam member 16 displaces the second crimping rods 20 radially inwardly against the force of the biasing springs 21 from the retracted condition of FIG. 12*b* toward the crimping condition of FIG. 13*b*. The operating member 11 is normally rotationally biased toward the retracted position by the reaction between leg 24*a* of the foxed torsion spring 24 (FIGS. 3*c* and 10) and the pin 25 connected with the operating tool 11, which pin extends through slot 44 contained in the pedestal 13.

According to another feature of the invention, in order to limit the degree of angular displacement of the operating member 11, and consequently the depth of crimp, a stop screw 47 (FIG. 10) having a knurled knob 48 is threadably mounted in a threaded opening 46 (FIG. 1) contained in the pedestal 13. Thus, by simple axial adjustment of the stop screw by rotation of the knob 48, the end of the stop screw may be axially displaced for engagement with the pin 25 that is connected with the operating member 11. The depth of the cable crimp 8 is thus influenced in a simple fashion via the actuation angle so that the stop represents a simple possibility of presetting the depth. The depth of the plug crimp 7, on the other hand, is firmly preset. Variations of these settings are conceivable so that the crimping device can in a simple manner be used for the most varied cable diameters.

While in accordance with the provisions of the Patent Statutes the preferred forms and embodiments of the invention have been illustrated and described, it will be apparent to those skilled in the art that changes may be made without deviating from the invention described above.

What is claimed is:

1. Crimping apparatus for crimping a tubular protective metal sleeve (6) concentrically about the junction between a plug connector (4) and a shielded cable (5), comprising:

(a) a fixed tubular support shaft (22) having a first end adapted to receive coaxially one end of the plug connector, said support shaft having a longitudinal axis;

(b) first annular die means (9) arranged colinearly of said support shaft to receive one end of the sleeve arranged concentrically about the plug;

(c) second annular die means (10) arranged longitudinally of said support shaft to receive the other end of the sleeve arranged concentrically about the adjacent portion of the cable, said first and second die means being relatively longitudinally spaced and angularly offset to effect different crimping operations on opposite ends of the sleeve;

(d) operating means (11) operable in a given direction from a retracted position to a crimping position for operating said first and second die means, thereby to crimp opposite ends of the sleeve to the plug connector and to the shielded cable, respectively; and (e) support means supporting said support shaft in a horizontal position, said support means including:

(1) a base (1); and (2) a vertical pedestal (13) having a lower end connected with said base, and an upper end connected with said support shaft;

(f) each of said first and second annular die means including:

(1) an annular die member (26, 27) colinearly arranged relative to said support shaft, said die member having a die face (26*a*, 27*a*) normal to said support shaft longitudinal axis;

(2) a plurality of radially-arranged crimping bars (19, 20) mounted for axial sliding displacement on said die face between outward retracted and inward crimping positions relative to said support shaft longitudinal axis, respectively;

(3) first spring means (21) biasing said crimping bars radially outwardly toward said retracted positions;

(4) cam means (15, 16) for displacing said crimping bars from their said retracted positions toward their said crimping positions; and (5) operating means (11) for operating said cam means to displace said crimping bars toward their crimping positions.

2. Crimping apparatus as defined in claim 1, wherein said operating means operates said first and second die means sequentially such that the crimping bars of one of said die means effects crimping of the sleeve at a later time than the other of said die means.

3. Crimping apparatus as defined in claim 1, wherein said operating means comprises an annular operating member (11) arranged concentrically about said first and second die means for angular displacement between crimping and retracted positions, respectively; and further including lever means (3) for angularly displacing said operating member between said crimping and said retracted positions.

4. Crimping apparatus as defined in claim 3, wherein said cam means associated with said first and said second die means includes a pair of annular operating cams (15, 16) arranged concentrically between said first and second die members and said annular operating member, respectively, said cam members having on their inner circumferences cam surfaces (15*a*, 16*a*) arranged for engagement by the outer ends of the associated crimping bars, respectively, said operating cams being connected with said operating member for simultaneous angular displacement therewith, whereby upon rotation of said operating member, said crimping bars are displaced radially inwardly toward crimping engagement at their inner ends with the associated portions of the tubular metal sleeve, respectively.

5. Crimping apparatus as defined in claim 4, wherein said first die member includes a first end arranged concentrically about said support shaft; and further including bearing means (23) supporting said annular operating member for rotation concentrically about said first die member first end.

6. Crimping apparatus as defined in claim 3, and further including first stop means (25) for limiting the angular extent of displacement of said operating member relative to said support shaft, thereby to control the extent of displacement and corresponding depth of crimp produced by said crimping bars.

7. Crimping apparatus as defined in claim 3, and further including second spring means (24) biasing said operating tool toward said released position.

8. Crimping apparatus as defined in claim 3, and further including second stop means (60, 61) for limiting the extent of axial displacement of said crimping rods radially relative to their associated die member.

9. Crimping apparatus as defined in claim 3, wherein said first die means produces a first crimp (7) having an annular bulge, and said second die means produces a second crimp (8) having a generally star-shaped cross-sectional configuration.

* * * * *